July 1, 1930.  C. W. AIKEN  1,768,534
CONVEYER
Filed Oct. 29, 1926
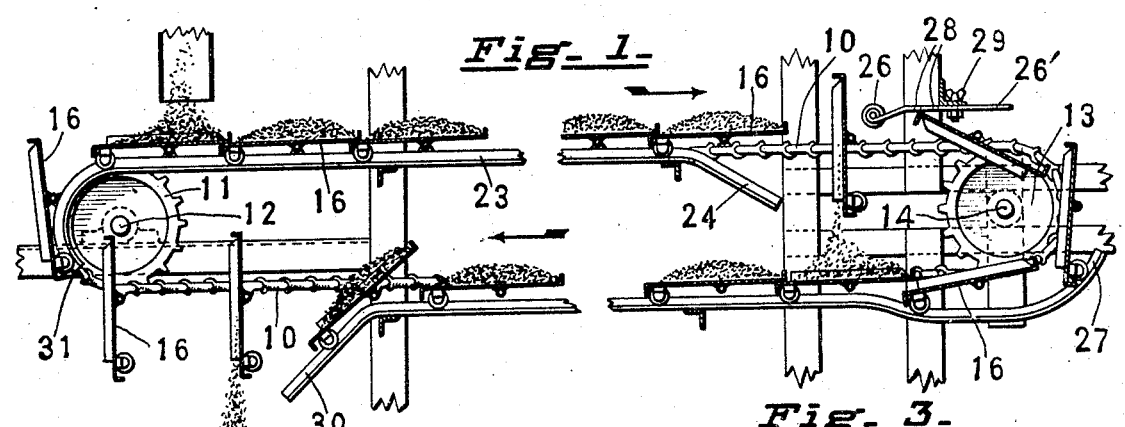
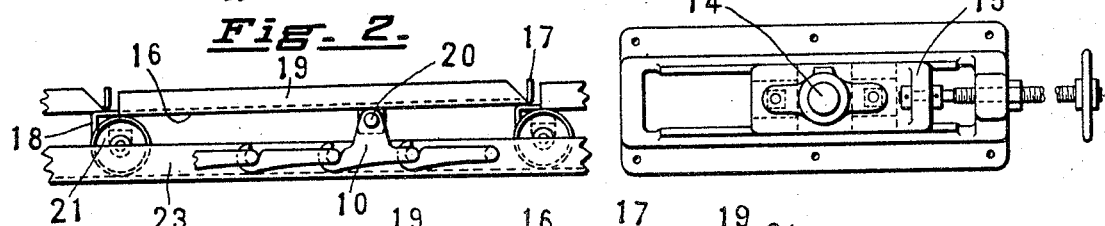
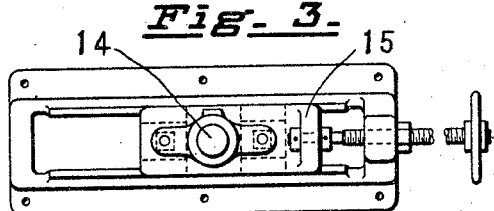
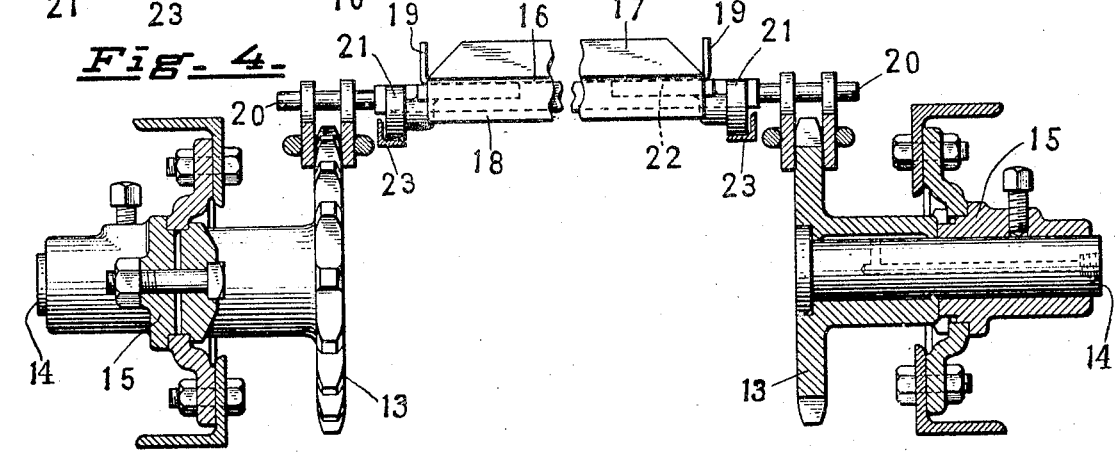
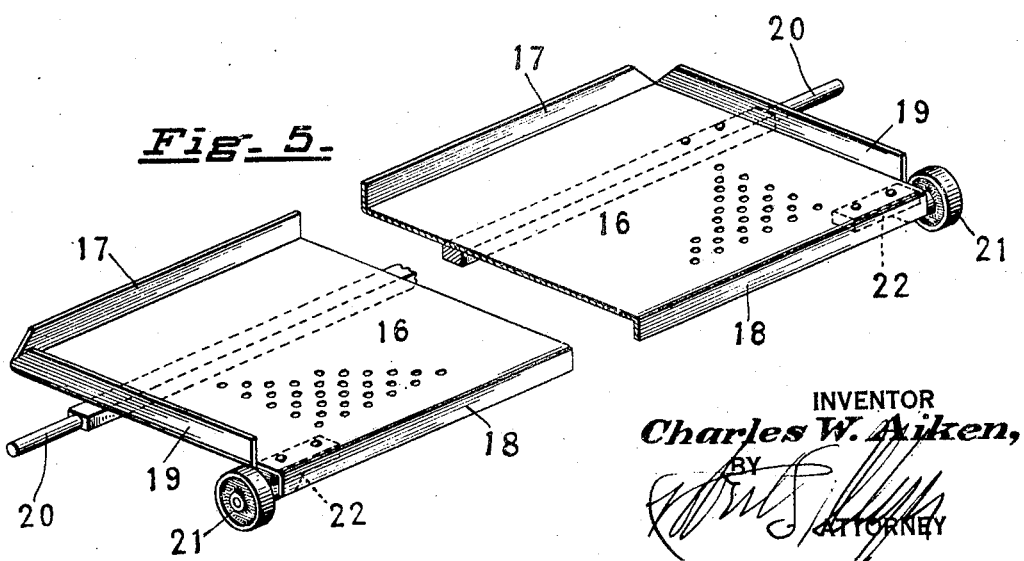
INVENTOR
Charles W. Aiken,
BY
ATTORNEY Patented July 1, 1930

1,768,534

UNITED STATES PATENT OFFICE

CHARLES W. AIKEN, OF FRANKLIN, NEW HAMPSHIRE

CONVEYER

Application filed October 29, 1926. Serial No. 144,955.

My invention relates to conveyer apparatus suitable for use in mixing, aerating, and drying more or less finely divided material.

The main subject matter in this application was disclosed in my prior application, Serial No. 652,925, which was issued on January 5, 1926 as U. S. Patent No. 1,568,791. The present application also discloses modifications of devices shown and described in said Letters Patent.

The main object is to provide a reliable conveyer apparatus made at a reasonable cost and which can be readily assembled, inspected, and repaired, and which will operate economically. Another object is to provide apparatus of this character having a maximum capacity. Another object is to effectively and uniformly dry granular, flaky, or powdery substances.

In the drawing I have illustrated one form of a conveyer for continuously mixing and drying material. The conveyer is so arranged and so constructed as to turn over and mix up the material intermittently as it is conveyed.

Fig. 1 is a side view illustrating apparatus embodying my invention.

Fig. 2 is an edge view of part of the conveyer.

Fig. 3 is a side view of an adjustable sprocket shaft bearing by which the tension of the conveyer chains may be regulated.

Fig. 4 is an enlarged vertical and partly sectional view showing a detail of the conveyer.

Fig. 5 is a broken perspective view of a conveyer pan.

A form of the conveyer embodying my invention is shown in Fig. 1 and is made up of more or less conventional type of chains 10 running on sprockets 11 on drive shaft 12 at one end and on sprockets 13 on stud shafts 14—14 at the other end. Each stud shaft 14 is preferably adjustable back and forth, for instance by means of take-up 15 (shown in Fig. 3) so as to permit the conveyer to be tightened up so as to operate satisfactorily. The material to be mixed and dried is carried on perforated pans 16 which overlap each other as shown in Fig. 1. Each pan preferably has an upturned flange 17 at one edge and downturned flange 18 at the other edge which reenforce the pans materially. Each pan also preferably has an end flange 19 which reenforces it and assists in holding the material on the pan. Each pan has a pivot shaft 20 which reenforces it and is suitably connected at each end to the conveyer chains 10. This pivot shaft is arranged nearer one edge than the other and the pan is provided with rollers 21 at the edge most remote from the pivot shaft. Each roller may conveniently be carried by a bracket 22 secured to the underside of the pan and is adapted to travel on the track 23 which may conveniently be formed of angle iron so that the pans are supported in the position shown in Fig. 1 as they pass along the upper stretch of the conveyer. On the upper stretch of the conveyer, the end 24 of the guide track 23 is inclined downwardly so that as each pan passes towards the right as viewed in Fig. 1, the rollers at its rear edge will ride down the inclines and the pans will hang vertically, dumping the contents down on to the lower stretch of the conveyer. Immediately above the sprockets 13 I provide an abutment 26 (which may be in the form of a roller) which stands in the path of movement of the pans and tilts each pan as it comes along above the path of the shaft 14 (Fig. 1) and thus jars the pan and turns it upside down and dumps all the material. As soon as the edge of the pan clears the tailpiece 26' of the abutment member the pan will tilt back again so that its roller will engage the upwardly curved ends 27 of the lower guide tracks of the conveyer. The abutment member 26—26' may be made adjustable back and forth as indicated in Fig. 1 by means of a slot or extra holes 28 suitably adapted to receive bolts 29, or by any other means so as to insure that the pans will be dumped at the proper time. The opposite end of the lower track is inclined downwardly at 30 similarly to the incline 24 so that the lower stretch of the conveyer will dump the material as illustrated in Fig. 1. The corresponding end of the upper guide track 23 is provided with a curved portion 31 to receive the rollers of the pans and direct them into their proper paths.

At the driven end I preferably employ as is best shown in Fig. 4, a construction using two stud shafts 14—14 which provides an unobstructed space in which the pans may freely swing at one end of the conveyer.

It is, of course, obvious that if conveyers similar to the one herein described be placed one beneath the other in such a manner that the material is dumped from the lower track of an upper conveyer to the upper track of a lower conveyer, that the mixing and drying process may be repeated indefinitely. One construction using three of these conveyers was shown in my original U. S. Patent No. 1,568,791. It is also obvious that the capacity of the conveyer for drying material may be appreciably increased by adding additional pans and proportionately increasing the length of the conveyer chains.

I wish to have it understood that I do not consider the exact construction and arrangement herein to be essential except so far as I have limited certain claims thereto.

I claim:

1. In a conveyer for drying finely divided material, two stationary tracks, each of said stationary tracks having a downwardly inclined portion, one of said tracks having an inwardly and upwardly curved portion, one of tracks having an inwardly and downwardly curved portion, side chains, a plurality of pans pivotally carried by said chains along axes nearer one edge than the other of said pans, and a stationary adjustable abutment for striking the bottom of the pans as they move with said chains to restore said pans to material carrying position.

2. In an endless conveyer for mixing and drying finely divided material, upper and lower stationary tracks having downwardly inclined portions at one end of each of said tracks and having curved portions at the other end of each of said tracks, side chains, a train of overlapping pans, a stationary adjustable abutting member positioned adjacent one of said curved portions and adapted to be struck by the bottom of each of said pans so as to jar and empty said pans and position the same for movement inside said latter curved portion.

3. A conveyer including an endless chain, spaced supports therefor, means for adjusting the length of distance between said supports, pans carried by said chains and adapted to be tilted to dumping position by gravity, an abutment for restoring said pans from dumping position to normal material conveying position and means for adjusting said abutment along said chain.

4. A conveyer comprising an endless chain, tiltable pans carried by said chain, oppositely disposed upper and lower tracks for supporting and guiding said pans around the chain, each of said tracks terminating at one end in a downwardly inclined portion, said pans being mounted on axles disposed to one side of the center whereby said pans are tilted by gravity at the inclined portions of the tracks, and guided and supported by said inclined portions for a portion of its tiltable movement, and an adjustable abutment disposed in the path of movement of said tilted pans and adapted to engage said tilted pans to restore the same to a position for carrying the material and passing around the curved portion of the chain.

CHARLES W. AIKEN.